United States Patent
Okazaki et al.

(10) Patent No.: US 12,503,387 B2
(45) Date of Patent: Dec. 23, 2025

(54) SEAL STRUCTURE OF WIRE DRAWING FURNACE FOR OPTICAL FIBER, AND PRODUCTION METHOD FOR OPTICAL FIBER

(71) Applicant: SUMITOMO ELECTRIC INDUSTRIES, LTD., Osaka (JP)

(72) Inventors: Iwao Okazaki, Osaka (JP); Satoshi Yoshikawa, Osaka (JP); Takashi Yamazaki, Osaka (JP); Makoto Aoki, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 294 days.

(21) Appl. No.: 17/295,630

(22) PCT Filed: Nov. 20, 2019

(86) PCT No.: PCT/JP2019/045518
§ 371 (c)(1),
(2) Date: May 20, 2021

(87) PCT Pub. No.: WO2020/105691
PCT Pub. Date: May 28, 2020

(65) Prior Publication Data
US 2022/0024800 A1    Jan. 27, 2022

(30) Foreign Application Priority Data

Nov. 21, 2018    (JP) ................................ 2018-218141

(51) Int. Cl.
*C03B 37/029* (2006.01)
(52) U.S. Cl.
CPC ........ *C03B 37/029* (2013.01); *C03B 2205/74* (2013.01); *C03B 2205/80* (2013.01)

(58) Field of Classification Search
None
See application file for complete search history.

(56) References Cited

U.S. PATENT DOCUMENTS

| 2009/0038345 A1 | 2/2009 | Otosaka et al. |
| 2010/0139323 A1 | 6/2010 | Nunome |
| 2015/0321944 A1 | 11/2015 | Yamazaki et al. |

FOREIGN PATENT DOCUMENTS

| CN | 102838275 A | 12/2012 |
| CN | 103269990 A | 8/2013 |

(Continued)

OTHER PUBLICATIONS

JP2013018691A EPO Machine Translation Performed May 5, 2023. (Year: 2023).*

(Continued)

*Primary Examiner* — Lisa L Herring
(74) *Attorney, Agent, or Firm* — Faegre Drinker Biddle & Reath LLP

(57) ABSTRACT

This seal structure of a wire drawing furnace for an optical fiber is for sealing a gap between an upper end opening of the wire drawing furnace for an optical fiber and a glass base material for an optical fiber inserted from the upper end opening into a furnace core tube. This seal structure has: a plurality of blade members circumferentially arranged in contact with a circumferential side surface of the glass base material for an optical fiber; a guide member, provided around the plurality of blade members, for allowing the plurality of blade members to slide linearly toward the circumferential side surface of the glass base material for an optical fiber; and a pushing/pulling action mechanism that causes the blade members to move in the radial direction of the glass base material for an optical fiber. The center of (Continued)

gravity of the plurality of blade members is located behind the tip surface of the guide member.

5 Claims, 3 Drawing Sheets

(56) References Cited

FOREIGN PATENT DOCUMENTS

| | | | | |
|---|---|---|---|---|
| JP | H05-066620 A | 3/1993 | | |
| JP | 2013018691 A | * 1/2013 | ........... | C03B 37/029 |
| JP | 2014-152083 A | 8/2014 | | |
| JP | 5821514 B2 | 11/2015 | | |
| WO | WO-2012/053394 A1 | 4/2012 | | |
| WO | WO-2014-115849 A1 | 7/2014 | | |
| WO | WO-2018-038154 A1 | 3/2018 | | |
| WO | WO-2018-038156 A1 | 3/2018 | | |

OTHER PUBLICATIONS

Fema, Fema National US&R Response System Structural Collapse Technician—Module 4 Lifting and Rigging, https://www.fema.gov/pdf/emergency/usr/module4.pdf, per Wayback Machine available online Feb. 25, 2015 (Year: 2015).*

* cited by examiner

SEAL STRUCTURE OF WIRE DRAWING FURNACE FOR OPTICAL FIBER, AND PRODUCTION METHOD FOR OPTICAL FIBER

TECHNICAL FIELD

The present disclosure relates to a seal structure of a wire drawing furnace for an optical fiber and a production method for the optical fiber.

This application is based upon and claims the benefit of priority from Japanese Patent Application No. 2018-218141 filed on Nov. 21, 2018, the entire contents of which are incorporated herein by reference.

BACKGROUND ART

Patent Literature 1 discloses a technique of a seal structure for sealing a gap between an upper end opening portion of a wire drawing furnace and a glass base material.

CITATION LIST

Patent Literature

Patent Literature 1: JP-A-2014-152083

SUMMARY OF INVENTION

The present disclosure provides a seal structure of a wire drawing furnace for an optical fiber for sealing a gap between an upper end opening portion of the wire drawing furnace for the optical fiber and a glass base material for the optical fiber inserted into a furnace core tube from the upper end opening portion, the seal structure including: a plurality of blade members circumferentially provided to abut on a circumferential side surface of the glass base material for the optical fiber; a guide member, provided around a periphery of the plurality of blade members, for linearly sliding the plurality of blade members toward the circumferential side surface of the glass base material for the optical fiber; and a pushing and pulling action mechanism causing the blade member to move in a radial direction of the glass base material for the optical fiber, in which a center of gravity of the plurality of blade members is provided at a location behind a tip surface of the guide member.

DESCRIPTION OF EMBODIMENTS

Technical Problem

Figure 1:
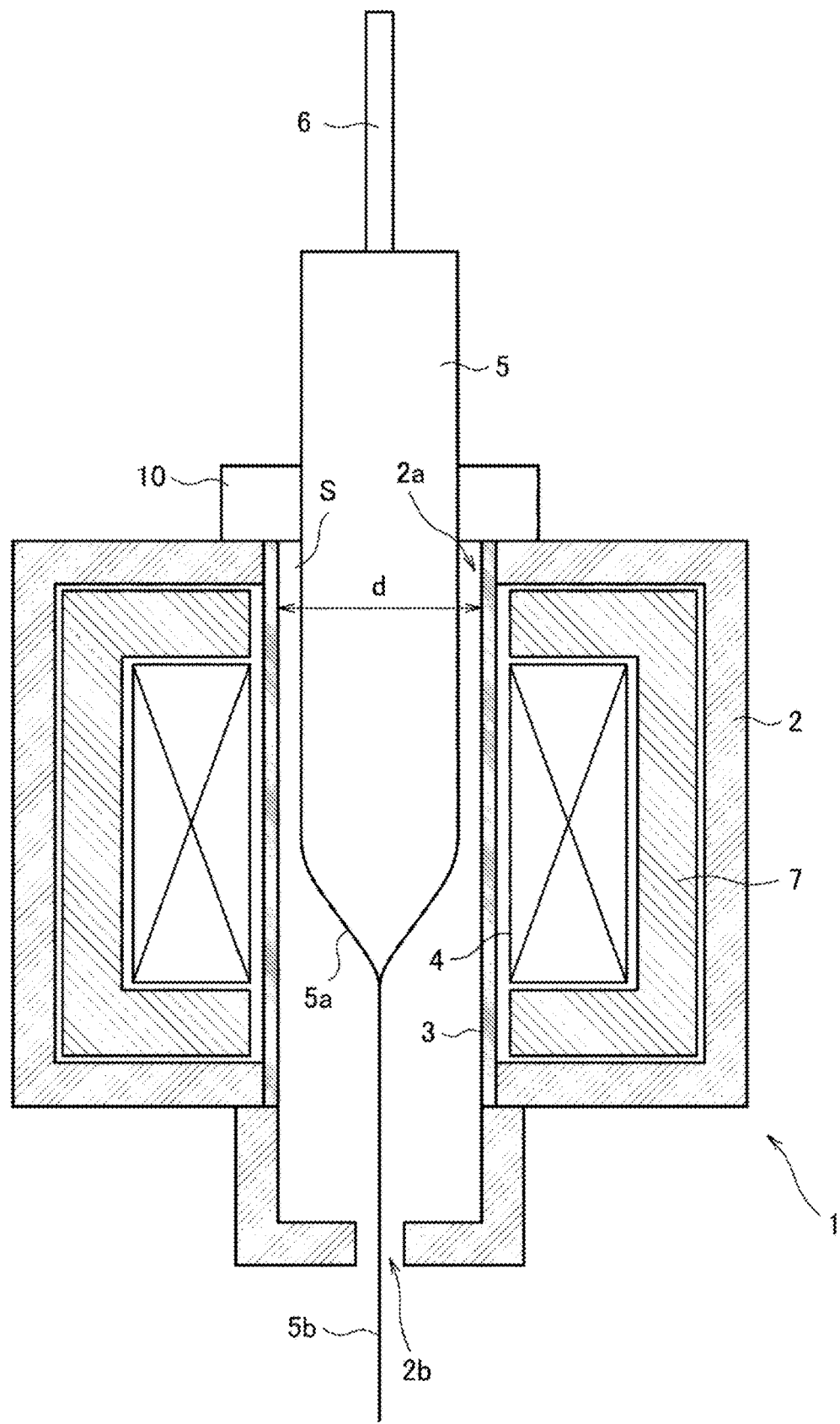
FIG. 1 is a diagram illustrating an outline of a wire drawing furnace for an optical fiber according to an embodiment of the present disclosure.

An optical fiber is manufactured in such a manner that a glass base material for the optical fiber containing quartz as a main component (hereinafter referred to as a glass base material) is inserted into a furnace core tube from an upper end opening portion of a wire drawing furnace for the optical fiber (hereinafter referred to as a wire drawing furnace), a tip of the glass base material is heated and fused to reduce a diameter thereof, and then the wire is drawn from a lower part of the wire drawing furnace. Since a temperature inside the wire drawing furnace here is significantly high at about 2000° C., a carbon part having excellent heat resistance is often used for a part in the wire drawing furnace.

In order to prevent thermal deterioration of the carbon part, in general, positive pressure is applied to the inside of the wire drawing furnace with an inert gas, and outside air (oxygen) is prevented from entering the wire drawing furnace. Meanwhile, in a case where a gap between an upper end opening portion of the wire drawing furnace and the glass base material is not well airtight (not sealed), the outside air may enter the wire drawing furnace. In order to prevent the outside air from entering the wire drawing furnace, for example, Patent Literature 1 discloses a technique of a seal structure for sealing the gap between the upper end opening portion of the wire drawing furnace and the glass base material.

However, in a case where a blade member (a seal member) does not move up to a planned location, not only the outside air may enter the wire drawing furnace but a wire drawing operation may be also affected. When the blade member tilts downward due to an own weight thereof at an advanced location, the blade member cannot move due to friction between the blade member and surroundings. Accordingly, when the glass base material is inserted and taken out, the glass base material and the seal structure may be damaged.

Here, an object of the present disclosure is to provide a seal structure of a wire drawing furnace for an optical fiber and a method for manufacturing the optical fiber, in which a closing operation of a blade member and an opening operation thereof can be surely performed.

Advantageous Effects of the Present Disclosure

According to the present disclosure, it is possible not only to prevent outside air from entering a wire drawing furnace, but also to prevent a glass base material and a seal structure from being damaged when the glass base material is inserted and taken out.

Description of Embodiments of the Present Disclosure

First, contents of embodiments of the present disclosure will be listed and described.

(1) One aspect of the present disclosure provides a seal structure of a wire drawing furnace for an optical fiber for sealing a gap between an upper end opening portion of the wire drawing furnace for the optical fiber and a glass base material for the optical fiber inserted into a furnace core tube from the upper end opening portion, the seal structure including: a plurality of blade members circumferentially provided to abut on a circumferential side surface of the glass base material for the optical fiber; a guide member, provided around a periphery of the plurality of blade members, for linearly sliding the plurality of blade members toward the circumferential side surface of the glass base material for the optical fiber; and a pushing and pulling action mechanism causing the blade member to move in a radial direction of the glass base material for the optical fiber, in which a center of gravity of the plurality of blade members is provided at a location behind a tip surface of the guide member. Since the center of gravity of the blade member is provided at the location behind the tip surface of the guide member, the blade member hardly tilts downward due to an own weight thereof even though the blade member is at an advanced location. Therefore, the blade member does not have difficulty in moving, and a closing operation of causing the blade member to move closer to the glass base material for the optical fiber and an opening operation of causing the blade member to move away from the glass base material for the optical fiber can be surely performed, such that it is possible not only to prevent outside air from entering the wire drawing furnace, but also to prevent the glass base material and the seal structure from being damaged when the glass base material is inserted and taken out.

(2) The center of gravity of the plurality of blade members is provided at the location behind the tip surface of the guide member by forming a rear end side of the plurality of blade members with a material of which specific gravity is higher than that of a front end side of the plurality of blade members. In a case where the rear end side thereof is changed to the material of which specific gravity is high, the center of gravity of the blade member can be easily provided at the rear thereof.

(3) The center of gravity of the plurality of blade members is provided at the location behind the tip surface of the guide member by installing a weight behind a center of the plurality of blade members. In a case where the weight is installed, the center of gravity of the blade member can be easily provided at the rear thereof.

(4) The center of gravity of the plurality of blade members is provided at the location behind the tip surface of the guide member by forming a width of the rear end side of the plurality of blade members to be wider than that of the front end side of the plurality of blade members. In a case where the width of the rear end side of the blade member is formed to be widened, the center of gravity of the blade member can be easily provided at the rear thereof.

(5) The center of gravity of the plurality of blade members is provided at the location behind the tip surface of the guide member by forming a thickness of the rear end side of the plurality of blade members to be thicker than that of the front end side of the blade member. In a case where the thickness of the rear end side of the blade member is formed to be thick, the center of gravity of the blade member can be easily provided at the rear thereof.

(6) A method for manufacturing an optical fiber according to one aspect of the present disclosure draws the optical fiber by using the seal structure of the wire drawing furnace for the optical fiber according to any one of (1) to (5). Since the above-described seal structure is used, the glass base material and the seal structure can be prevented from being damaged when the glass base material is inserted and taken out.

Details of Embodiments of the Present Disclosure

Hereinafter, a desirable embodiment of a seal structure of a wiring drawing furnace for an optical fiber and a method for manufacturing the optical fiber according to the present disclosure will be described with reference to the accompanying drawings. In the following, while a resistance furnace in which a furnace core tube is heated by a heater will be described as an example, the present disclosure is also applicable to an induction furnace in which a high-frequency power source is applied to a coil and the furnace core tube is induction-heated. A suspension mechanism of a glass base material, a configuration of a heat insulating material, or the like are also described below as an example, and the present disclosure is not limited thereto.

FIG. 1 is a diagram illustrating an outline of a wire drawing furnace for an optical fiber according to an embodiment of the present disclosure. A wire drawing furnace 1 includes a furnace housing 2, a furnace core tube 3, a heating source (a heater) 4, and a seal structure 10. The furnace housing 2 has an upper end opening portion 2a and a lower end opening portion 2b, and is made of, for example, stainless steel. The furnace core tube 3 is formed in a cylindrical shape at a central portion of the furnace housing 2, and communicates with, for example, the upper end opening portion 2a. The furnace core tube 3 is made of, for example, carbon, and a glass base material 5 is inserted into the furnace core tube 3 from the upper end opening portion 2a while the furnace core tube 3 is sealed by the seal structure 10.

In the furnace housing 2, the heater 4 is disposed to surround the furnace core tube 3, and the heat insulating material 7 is housed to cover an outside of the heater 4. The heater 4 heats and fuses the glass base material 5 inserted into the furnace core tube 3, and suspends an optical fiber 5b of the glass base material 5 which is fused and reduced in diameter from a lower end portion 5a thereof. The glass base material 5 can be moved in a wire drawing direction (a downward direction) by a separately provided moving mechanism, and a support rod 6 for suspending and supporting the glass base material 5 is connected to an upper side of the glass base material 5. The wire drawing furnace 1 is provided with a gas supply mechanism (not illustrated) in the furnace for an inert gas or the like, and the inert gas or the like for preventing oxidation and deterioration can be supplied into the furnace core tube 3 and around the heater 4.

While FIG. 1 illustrates an example in which an upper end portion of an inner wall of the furnace core tube 3 forms the upper end opening portion 2a as it is, the present disclosure is not limited thereto. For example, an upper end opening portion narrower than an inner diameter d of the furnace core tube 3 may be provided on an upper side of the furnace core tube 3, and here, a gap to be sealed becomes a gap generated between the narrow upper end opening portion and the glass base material 5. While a cross-sectional shape of the glass base material 5 is basically generated to form a perfect circle, a non-circle may be partly formed regardless of accuracy thereof, or an elliptical shape or the like may be formed. A cross section of the upper end opening portion 2a may be a circular shape, and accuracy thereof does not matter.

One embodiment of the present disclosure describes the seal structure 10 as a target for sealing a gap S between the upper end opening portion 2a of the wire drawing furnace 1 and an outer periphery of the glass base material 5 inserted into the furnace core tube 3 from the upper end opening portion 2a, and particularly describes that the glass base material 5 in the wire drawing furnace is heated by the heater 4 while the seal structure 10 provided in the upper end opening portion 2a prevents the outside air outside the furnace from entering the furnace.

Figure 2:
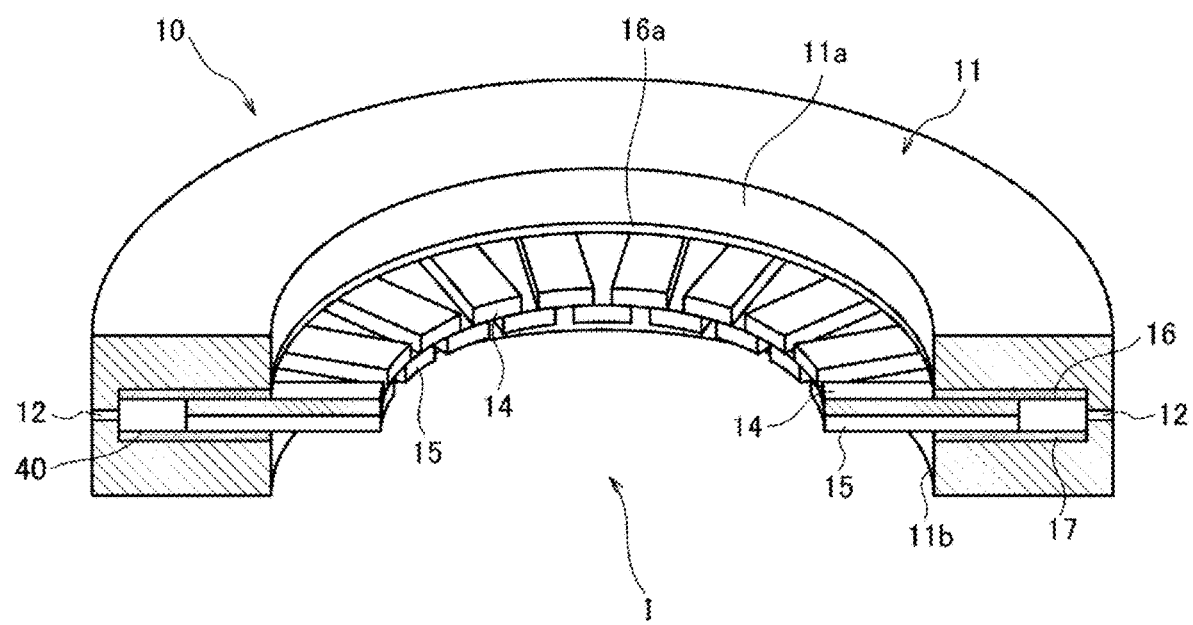
FIG. 2 is a diagram illustrating an example of a seal structure.
Figure 3:
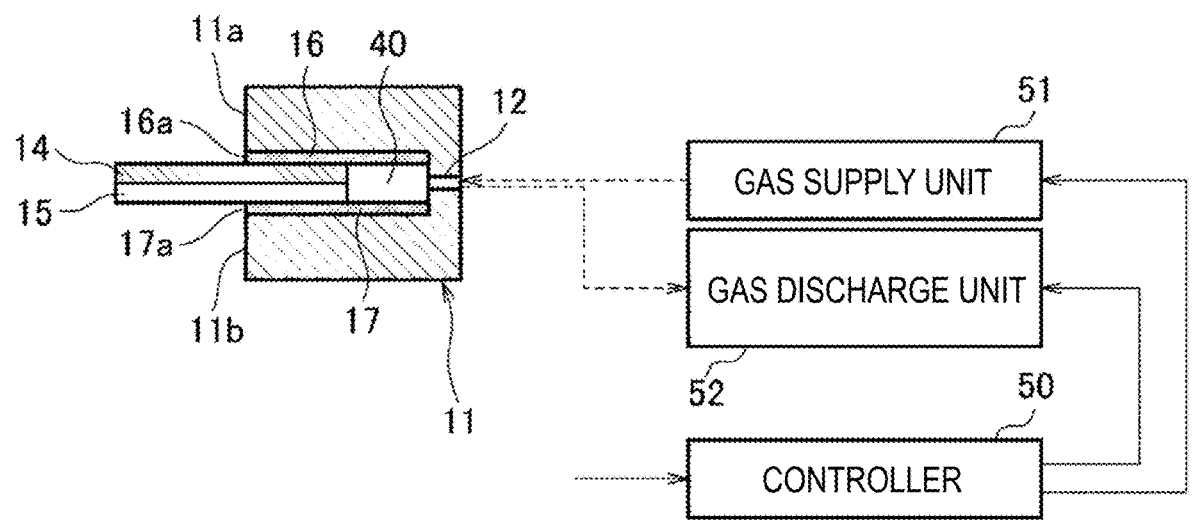
FIG. 3 is a diagram illustrating an operation of a blade member in the seal structure.

FIG. 2 is a diagram illustrating an example of the seal structure, and FIG. 3 is a diagram illustrating an operation of a blade member in the seal structure.

The seal structure 10 includes: a plurality of blade members 14 and 15 having heat resistance; guide members 16 and 17 for housing the blade members 14 and 15 and linearly sliding the blade members 14 and 15; a housing 11 for housing the blade members 14 and 15 and the guide members 16 and 17; and a pushing and pulling action mechanism having an action of pushing the blade members 14 and 15 inward or pulling the blade members 14 and 15 outward by using, for example, a pressure difference between gases.

As illustrated in FIG. 2, the housing 11 is a disk-shaped member having a concentric through hole, and an opening for inserting the blade members 14 and 15 is provided on an inner peripheral surface of the housing 11. The inner peripheral surface of the housing 11 is located in a furnace inner space I communicating with the furnace core tube 3 described with reference to FIG. 1.

The housing 11 is made of, for example, stainless steel, and may include a mechanism (for example, a water cooling system not illustrated) in which the blade members 14 and 15 and the guide members 16 and 17 are cooled to keep temperatures thereof at, for example, 400° C. or below (desirably 300° C. or below in a case where carbon is used as a material of each member). In a case where the cooling mechanism is provided, it is possible to prevent deterioration in carbon and metal to be used for the blade members 14 and 15, the guide members 16 and 17, and the housing 11 caused by radiant heat of the wire drawing furnace.

The blade members 14 and 15 extend radially with respect to a central axis of the housing 11 respectively, and are installed in the housing 11 at, for example, two upper and lower stages. A plurality of blade members 14 are provided along the inner peripheral surface of the housing 11 at an approximately equal space, and a plurality of blade members 15 are provided below the blade members 14 and are also provided along the inner peripheral surface of the housing 11 at an approximately equal space. The blade members 14 and 15 have, for example, an approximately rectangular parallelepiped shape of which cross-sectional shape on a plane perpendicular to a movement direction becomes an approximately rectangular shape, are alternately disposed at the two upper and lower stages, and protrudes from the housing 11 to abut on a side surface of the glass base material.

The material of the blade members 14 and 15 is desirably carbon, and in addition to carbon, for example, quartz glass, SiC coated carbon, or the like may also be adopted.

A width of the blade members 14 and 15 described above and the number thereof may be appropriately selected according to an outer diameter of the glass base material to be used, an amount of variation in the outer diameter thereof, a bending amount thereof, or the like.

For example, the guide members 16 and 17 are formed so that the blade members 14 and 15 can be inserted thereinto. The guide member 16 is installed on an upper side of the blade member 14, and the guide member 17 is installed on a lower side of the blade member 15, respectively. The guide members 16 and 17 may be integrated with the housing 11.

The material of the guide members 16 and 17 is also desirably carbon, and boron nitride (BN), and metals such as stainless steel, molybdenum disulfide ($MoS_2$), or the like may also be adopted.

An operation of the blade member will be described with reference to FIG. 3 as an example of using the pressure difference between gases as the pushing and pulling action mechanism.

As illustrated in FIG. 3, the housing 11 includes a supply and discharge port 12 for supplying and discharging gas to and from an internal pressure applying space 40, and gas from a gas supply unit 51 can be stored in the pressure applying space 40 via the supply and discharge port 12. The gas stored in the pressure applying space 40 can also be discharged (sucked out) from a gas discharge unit 52 via the supply and discharge port 12. The gas supply unit 51 and the gas discharge unit 52 are electrically connected to the controller 50.

Front surfaces 11a and 11b are formed on the inner peripheral surface of the housing 11. The front surface 11a is provided at a location on an upper side of the blade member 14 and is provided to be curved to surround the furnace inner space I described with reference to FIG. 2. The front surface 11b is provided at a location on a lower side of the blade member 15 and is also provided to be curved to surround the furnace inter space I.

Tip surfaces 16a and 17a are formed on inner peripheral surfaces of the guide members 16 and 17. The tip surface 16a is provided to be curved to surround the furnace inner space I between the upper side of the blade member 14 and the front surface wall portion 11a, and the tip surface 17a is also provided to be curved to surround the furnace inner space I between the lower side of the blade member 15 and the front surface wall portion 11b.

Figure 4:
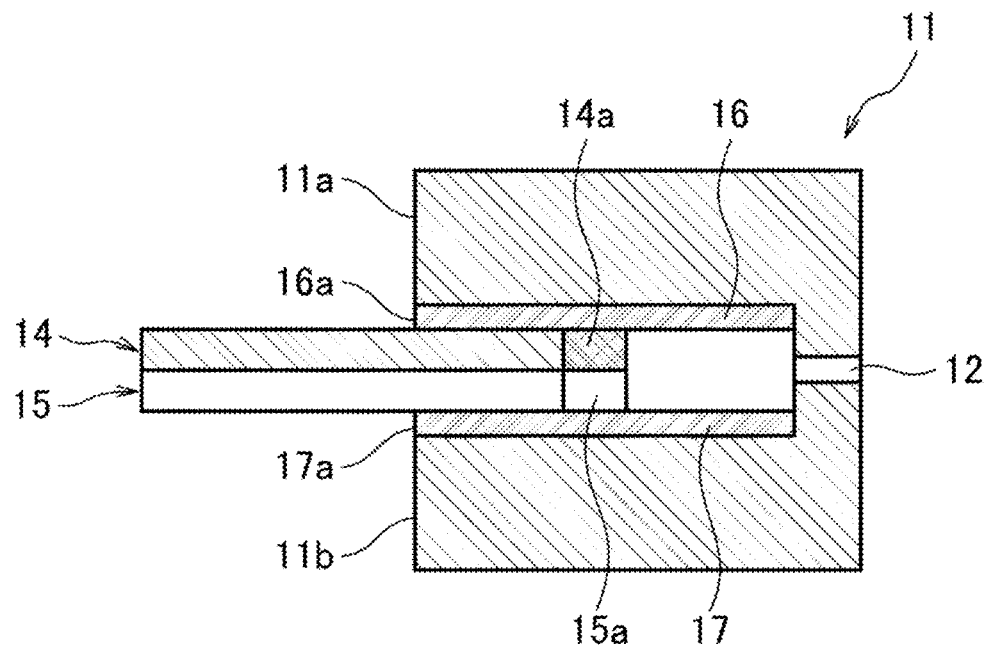
FIG. 4 is a diagram illustrating a blade member according to a first embodiment.

Here, a center of gravity of the blade members 14 and 15 of the embodiment is always provided at a location behind the tip surfaces 16a and 17a of the guide members 16 and 17 (a location closer to an outer peripheral surface of the housing 11) during the wire drawing operation. A method for providing the center of gravity of the blade member at the location behind the tip surface of the guide member is not limited, and for example, in an example shown in FIG. 4, a weight 14a is installed behind a center of the blade member 14. Accordingly, from when a tip surface of the blade member 14 is farthest away from the side surface of the glass base material (when the blade member 14 reaches a last retracted location in an allowable movement range) until the tip surface thereof abuts on the side surface of the glass base material (corresponding to when the blade member 14 almost reaches a most advanced location in the allowable movement range), the center of gravity of the blade member 14 is always maintained behind the tip surface 16a of the guide member 16 in the housing 11.

Even in a case where a weight 15a is installed behind a center of the blade member 15 and a tip surface of the blade member 15 abuts on the side surface of the glass base material, the center of gravity of the blade member 15 is always maintained behind the tip surface 17a of the guide member 17 in the housing 11.

As described above, in the embodiment, the center of gravity of the blade members 14 and 15 is always provided at the location behind the tip surfaces 16a and 17a of the guide members 16 and 17, and even though the blade members 14 and 15 are at the advanced locations, the blade members 14 and 15 hardly tilt downward due to own weights thereof.

Therefore, friction between the blade member 14 and the upper guide member 16 and friction between the blade member 14 and the lower blade member 15 do not significantly occur, and friction between the blade member 15 and the upper blade member 14 and friction between the blade member 15 and the lower guide member 17 do not significantly occur, such that it is possible to surely perform a closing operation of causing the blade members 14 and 15 to move closer to the side surface of the glass base material and an opening operation of causing the blade members 14 and 15 to move away from the side surface of the glass base material.

In a case where the weights 14a and 15a are installed, the center of gravity of the blade members 14 and 15 can be easily provided at the rear of the blade members 14 and 15.

According to the method for manufacturing the optical fiber using the above-described seal structure, it is possible not only to prevent the outside air from entering the wire drawing furnace, but also to prevent the glass base material and the seal structure from being damaged when the glass base material is inserted and taken out.

As described above, the embodiment describes an example in which the weight is installed in order to provide the center of gravity of the blade members 14 and 15 at the rear thereof. However, the present disclosure is not limited to the example.

Figure 5:
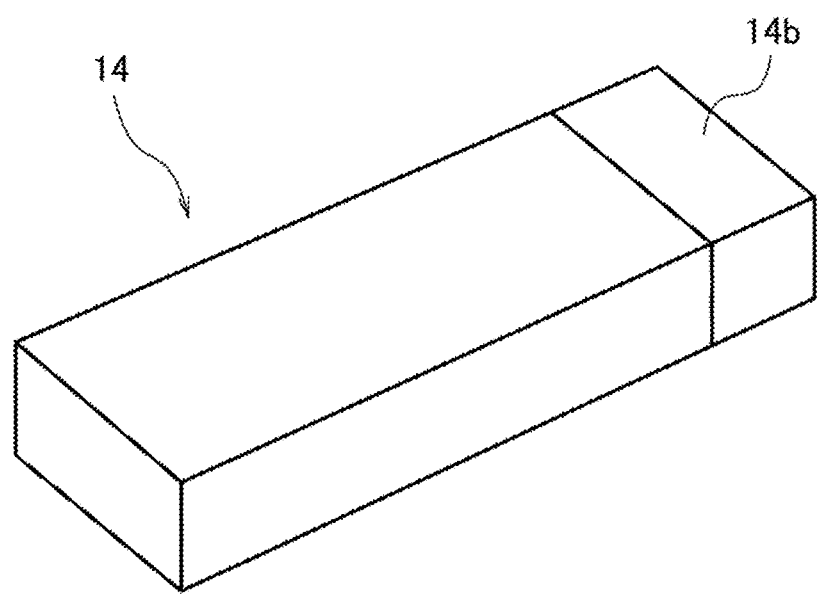
FIG. 5 is a diagram illustrating a blade member according to a second embodiment.

FIG. 5 is a diagram illustrating a blade member according to a second embodiment, in which, for example, a high specific gravity portion 14b made of tungsten, which has a heavier specific gravity than that of a front end side of the blade member 14, is provided at, for example, a rear end side of the blade member 14. In a case where the blade member 14 is formed to increase the mass on a side closer to the outer peripheral surface of the housing 11, the center of gravity of the blade member 14 can be easily provided at the rear thereof.

FIG. 5 illustrates an example of the blade member 14, and in a case where the blade member 15 is also formed in the same manner, the center of gravity of the blade member 15 can be easily provided at the rear thereof.

Alternatively, although not illustrated, for example, the blade members 14 and 15 having a thick portion at a rear end thereof may be used. Alternatively, for example, the blade members 14 and 15 having a wide portion at the rear end thereof may be used. Alternatively, the blade members 14 and 15 of which front end is reduced in weight may be used.

In a case where the blade members 14 and 15 are formed to increase a thickness on the side closer to the outer peripheral surface of the housing 11, to increase a width on the side closer to the outer peripheral surface of the housing 11, and to reduce a weight of a side farther from the outer peripheral surface of the housing 11, the center of gravity of the blade members 14 and 15 can be easily provided at the rear thereof.

It should be considered that the embodiments disclosed herein are examples in all respects and are not restrictive. The scope of the present disclosure is not indicated by the embodiments, but indicated by the scope of the claims. The present disclosure is intended to include all the modifications within the meaning equivalent to the scope of the claims and within the scope thereof.

REFERENCE SIGNS LIST

1: wire drawing furnace for optical fiber
2: furnace housing
2a: upper end opening portion
2b: lower end opening portion
3: furnace core tube
4: heater
5: glass base material for optical fiber
5a: lower end portion
5b: optical fiber
6: support rod
7: insulating material
10: seal structure
11: housing
11a, 11b: front surface
12: supply and discharge port
14, 15: blade member
14a, 15a: weight
14b: high specific gravity portion
16, 17: guide member
16a, 17a: tip surface
40: pressure applying space
50: controller
51: gas supply unit
52: gas discharge unit
S: gap between upper end opening portion and outer periphery of glass base material
d: inner diameter of furnace core tube

The invention claimed is:

1. A manufacturing method of an optical fiber, comprising:
    drawing the optical fiber by using a seal structure of a wire drawing furnace for the optical fiber for sealing a gap between an upper end opening portion of the wire drawing furnace for the optical fiber and a glass base material for the optical fiber inserted into a furnace core tube from the upper end opening portion, wherein the seal structure includes: a plurality of blade members that is circumferentially provided to abut on a circumferential side surface of the glass base material for the optical fiber; a guide member that is provided around a periphery of the plurality of blade members and for linearly sliding the plurality of blade members toward the circumferential side surface of the glass base material for the optical fiber; and a supply and discharge port for supplying and discharging a gas that causes the blade member to move in a radial direction of the glass base material for the optical fiber; and
    providing a center of gravity of the plurality of blade members at a location behind a tip surface of the guide member, from when a tip surface of the blade member is farthest away from the side surface of the glass base material until the tip surface thereof abuts on the side surface of the glass base material, at all times during drawing of the optical fiber.

2. The manufacturing method according to claim 1, wherein providing the center of gravity of the plurality of blade members at the location behind the tip surface of the guide member includes:
    forming a rear end side of the plurality of blade members with a material of which specific gravity is higher than that of a front end side of the plurality of blade members.

3. The manufacturing method according to claim 1, wherein providing the center of gravity of the plurality of blade members at the location behind the tip surface of the guide member includes:
    installing a weight behind a center of the plurality of blade members.

4. The manufacturing method according to claim 1, wherein providing the center of gravity of the plurality of blade members at the location behind the tip surface of the guide member includes:
    forming a width of the rear end side of the plurality of blade members to be wider than that of the front end side of the plurality of blade members.

5. The manufacturing method according to claim 1, wherein providing the center of gravity of the plurality of blade members at the location behind the tip surface of the guide member includes:

forming a thickness of the rear end side of the plurality of blade members to be thicker than that of the front end side of the blade member.

\* \* \* \* \*